US006281886B1

(12) United States Patent
Ranieri

(10) Patent No.: US 6,281,886 B1
(45) Date of Patent: Aug. 28, 2001

(54) TOUCHSCREEN KEYBOARD SUPPORT FOR MULTI-BYTE CHARACTER LANGUAGES

(75) Inventor: Robert Ranieri, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/326,880

(22) Filed: Jun. 7, 1999

(30) Foreign Application Priority Data

Jul. 30, 1998 (CA) ................................................ 2244431

(51) Int. Cl.[7] ............................................ G09G 5/00
(52) U.S. Cl. .............................................. 345/173; 345/171
(58) Field of Search ........................... 345/173, 171, 345/168, 169, 179; 341/22, 23, 28; 178/18.1, 18.01, 19.01

(56) References Cited

U.S. PATENT DOCUMENTS

| 4,531,119 | * | 7/1985 | Nakayama et al. | 345/171 |
|---|---|---|---|---|
| 5,319,386 | * | 6/1994 | Gunn et al. | 345/171 |
| 5,623,261 | | 4/1997 | Rose | 341/26 |
| 5,717,425 | * | 2/1998 | Sasaki | 345/168 |
| 5,945,928 | * | 8/1999 | Kushler et al. | 345/171 |

* cited by examiner

Primary Examiner—Xiao Wu
(74) Attorney, Agent, or Firm—Louis J. Percello; Perman & Green, LLP

(57) ABSTRACT

The invention relates to the entering, displaying and processing of text of various human languages consisting of multi-byte characters when the text is entered by means of a touchscreen terminal keyboard into a programmed computer system. The computer system includes an operating system and other software providing means for converting inputs from the touchscreen keyboard into displayed characters and a keyboard definition file for processing by the computer system to provide the touchscreen keyboard on the display. The keyboard definition file includes means for specifying a national language and means for supporting inputs of multi-byte character language. A touchscreen support module functions in conjunction with the converting means and a keyboard input module functions in conjunction with the keyboard definition file. The touchscreen support module and the keyboard input module are executed by the computer system to process inputs entered by the user from the touchscreen keyboard to display multi-byte characters of the national language on the display screen. The invention also includes a method for processing and displaying inputs including multi-byte characters of national languages on a touchscreen keyboard.

16 Claims, 3 Drawing Sheets

TOUCHSCREEN KEYBOARD SUPPORT FOR MULTI-BYTE CHARACTER LANGUAGES

FIELD OF THE INVENTION

The subject invention relates to improvements in the processing of text and information entered into an information handling system by way oft touchscreen terminals. The invention more particularly relates to the entering, displaying and processing of text of various human languages consisting of multi-byte characters when the text is entered by means of a touchscreen terminal keyboard into a programmed computer system.

BACKGROUND OF THE INVENTION

Terminal devices which have found significant acceptance for use by consumers to enter information into computer systems are the self-service terminals using touchscreen technology. The use of touchscreen technology for user input into computer systems provides a system which is user friendly to customers. One reason for this acceptance is that each screen in the application running on the system can be provided with just the number of keys and options needed by the user at that time for a particular transaction. Other keys and functions which are not needed do not appear on the screen, thereby eliminating potential confusion and inconveniences to the user of the terminal. If there is a need for the user or customer to input text into the system, such as a name or address, a full screen keyboard can be displayed on the touchscreen for the customer to enter the required information. This full screen keyboard can appear similar to a physical computer keyboard with which a typical user would have some familiarity. Such systems are self-functioning normally and do not require an operator in regular attendance.

Touchscreen technology is well known and terminals implementing such technology are available from various manufacturers. Examples of such terminals include IBM 5990 Consumer Transaction Machine, Interbold 1055 Interactive Marketing Terminal and NCR 5682 Self Service Terminal.

Consumer interface touchscreen systems exist today and are often implemented for user input in the English language as well as other single byte character languages such as French, Italian and Spanish. An example of such a system is the Service Ontario Kiosks which allow customers to obtain government services and products seven days a week with extended hours of operation. These kiosks have been designed and supplied by IBM Canada Ltd. to the Government of Ontario and are located at major shopping centres throughout Ontario. These kiosks function like sophisticated automated bank machines and allow the public to conveniently receive services including purchase a vehicle license sticker, purchase a driver/vehicle or carrier abstract, order a personalized or graphic vehicle license plate, purchase a used vehicle information package, pay fines to the Ministry of the Attorney General resulting from vehicular infractions, pay parking tickets in certain major cities, and change an address for such things as Ontario Health Card, Ontario driver's license, and Ontario vehicle registration. Similar self service systems providing the same or similar services exist in many other jurisdictions and geographies.

A key component to the operation and functioning of the aforementioned Service Ontario Kiosks is the IBM® Consumer Device Services which is a computer program intended primarily for use in multimedia self-service kiosk environments. A specific example of the IBM Consumer Device Services (CDS) product is the IBM Consumer Device Services for OS/2® which is a licensed program for operation on all Intel® architecture personal computer systems that support OS/2 and available from IBM. Further discussion and more details of the CDS product are contained in the subsequent description provided in this application with respect to a preferred embodiment of the subject invention.

For multi-byte character language inputs from a physical keyboard into a computer system, the operating system performs the handling of multiple keystrokes per character on behalf of an application program running on the computer system. The module of the operating system which performs this task is referred to as an input method editor (IME). Input method editors are also referred to as front end processors as the editor immediately manipulates the entered information to display the desired text on the screen. The IME module, or applet, of the operating system, allows the user to enter the thousands of different characters used in Far Eastern written languages such as Chinese, Japanese and Korean, using a standard 101-key keyboard. IMEs can be used when text is entered that doesn't involve typing each character directly and are widely used in operating systems for entering ideographs and other characters phonetically, or component by component, into computer systems. The user composes each character in one of several ways, including by radical, that is, a group of strokes in a character that are treated as a unit for the purpose of sorting, indexing and classification, by phonetic representation or by typing in the numeric codepage index of the characters, which is a standard index for characters of all national languages, promulgated by the International Standard Organization. IMEs are widely available and Windows® and OS/2 operating systems include an IME module with the operating system that handles physical keyboard inputs.

An IME consists of an engine that converts input keystrokes into phonetic and ideographic characters to be displayed, plus a dictionary of commonly used ideographic words. As the user enters keystrokes, the IME engine functions by attempting to guess which ideographic character or characters the keystrokes should be converted into. Since many ideographs have identical pronunciation, the first guess of the IME engine may not always be correct and the user may then be provided an opportunity to choose from a list of homophones. The homophone that the user selects then becomes the IME engine's first guess for that ideograph the next time around.

Further details and understanding of IMEs may be obtained from the reference "Developing International Software for Windows 95 and Windows NT", copyright 1995 by Nadine Kano.

Although inputs of multi-byte characters from physical keyboards are handled by computer operating systems having input method editors, prior to the present invention, no such capability existed for handling multi-byte character inputs entered from touchscreen keyboards. Touchscreen keyboards only presently exist for handling single byte characters such as inputs in the English language. With multi-byte character languages such as Chinese, Korean and Japanese, a problem arises in trying to implement the touchscreen keyboard in presently available computer operating systems. A single touch of a touchscreen keyboard can no longer represent a full character. Multiple symbols or entries are needed to be inputted in order to form a single character. No solution or support presently exists in popular operating systems such as OS/2, Windows 95 or Windows NT to allow for touchscreen keyboard input for multi-byte character languages.

An indication of existing prior art is provided by Robert A. Rose in U.S. Pat. No. 5,623,261 entitled "Method and System for Translating Keyed Input Within a Data Processing System". This patent issued Apr. 22, 1997 and is assigned to International Business Machines Corporation. This reference provides for the processing of data input resulting from the selection of keys on a computer input device. A method and system is disclosed which provides for the converting of keyboard keystrokes into character and function input codes for processing and, more particularly, for translating keyboard scan codes into function and character input codes which may be utilized by data processing systems having diverse operating systems and keyboard hardware. Although various national languages and use of touchscreens as input devices are alluded to in this reference, the problem of handling multi-byte character language inputs by means of a touchscreen is not addressed.

It is therefore an object of the present invention to provide improvements in data processing systems for the handling of inputs from touchscreens.

It is another object of the present invention to provide for the handling of multi-byte character languages entered into a computer system by a touchscreen keyboard.

It is another object of the invention to provide for the handling of multiple multi-byte character languages entered into computer systems using touchscreen keyboards.

It is a further object of the present invention to provide for self-service terminals which include touchscreens for entering into a computer system text and information consisting of multi-byte characters or multiple multi-byte characters of human languages as well as single byte character languages.

It is a further object of the invention to provide a method for the processing and displaying of multi-byte characters on a display of a touchscreen keyboard.

BRIEF DESCRIPTION OF THE INVENTION

In accordance with one aspect of the invention, there is provided a programmed computer system enabling a user to enter multi-byte characters of national languages into the computer system from a touchscreen keyboard and to display the characters on a display screen, where said computer system includes an operating system having means for converting inputs from a physical keyboard into displayed characters, and a keyboard definition file for processing by the computer system to provide the touchscreen keyboard on the display. The improvement in the computer system comprises said keyboard definition file includes means for specifying a national language for the touchscreen keyboard and means for supporting multi-byte character language inputs from the touchscreen keyboard entered by the user; and a keyboard input module functioning in conjunction with the said keyboard definition file; and a touchscreen support module functioning in conjunction with said converting means, whereby said keyboard input module and said touchscreen support module executed by the computer system, process inputs entered by the user from the touchscreen keyboard to display multi-byte characters of the national language on the display screen.

In accordance with another aspect of the invention, there is provided a method for use in a programmed computer system for processing and displaying user inputs including characters of multi-byte national languages on a display of a touchscreen keyboard. The method comprises the steps of specifying a national language of the characters to be entered and displayed; displaying a touchscreen keyboard enabled for a user to enter characters of said multi-byte national language; providing multi-byte national language character inputs from the touchscreen; translating said multi-byte character touchscreen inputs into scan codes to create responses by an input method editor; and interpreting said responses to display the multi-byte characters in said national language on said display of the touchscreen.

BRIEF DESCRIPTION OF THE DRAWINGS

The foregoing and other objects, aspects and advantages of the invention will be better understood from the following detailed description of a preferred embodiment of the invention with reference to the accompanying drawings in which.

DESCRIPTION OF THE PREFERRED EMBODIMENTS OF THE INVENTION

Figure 1:
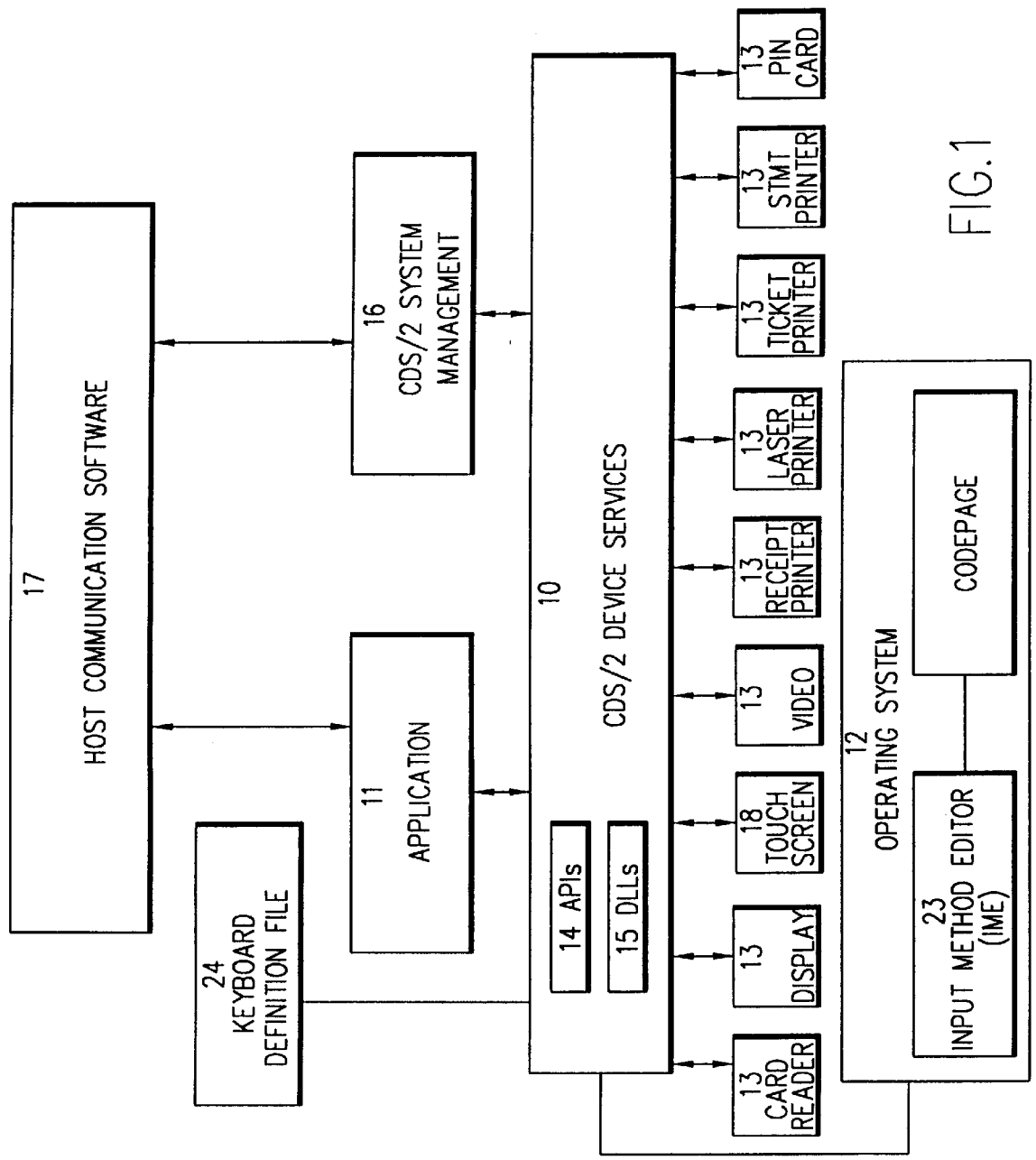
FIG. 1 is a functional block diagram broadly referencing the IBM Consumer Device Services for OS/2 product, illustrating aspects of the subject invention.

The present invention will be described and illustrated as part of the IBM Consumer Device Services for OS/2 (CDS/2) program product as is broadly illustrated in FIG. 1 and running on any suitable computer system. However, it is appreciated that this is only a preferred environment where it has been found the subject invention has a useful application but the invention is not limited to the specifics of this environment. As is diagrammatically shown in FIG. 1, CDS/2 10 provides a development environment for facilitating the development of self-service multimedia kiosk applications. Such a self-service multimedia application is shown generally at block 11. In this embodiment, CDS/2 10 executes under the OS/2 operating system for the computer system shown generally at 12. It functions as an application interface layer of software that shields the kiosk application 11 from the hardware components of the computer system and in particular, the specifics of a plurality of kiosk devices shown by blocks 13 and 18 attached to the system. CDS/2 10 helps manage the attached kiosk devices 13 and 18 on behalf of application 11, thereby allowing the application program developer to concentrate on the customer interface provided by application 11 to the user of the kiosk. The application programmer can call and activate the functions of devices 13 and 18 through standardized application program interface (API) calls as shown by block 14 for the devices 13 and 18, as is well known. In other words, CDS/2 10 can be thought of as a collection or toolkit of functions consisting of a plurality of dynamic link libraries (DLLs) as shown by block 15 for connection to and performing the various functions required by devices 13 and 18, when called by the APIs 14. CDS/2 also provides built-in system management and diagnostic subsystems as generally shown by block 16 to help maintain the various kiosk devices 13 and 18 attached to the system. The implementation of such system management functions is also well known and need not be further described here. Host communication software 17 provides for the interconnection of the local kiosk system to a remote host as is known.

As for the self-service kiosk application used to illustrate the subject invention, CDS/2 supports and interfaces with the various kiosk devices 13 and 18 to provide the plurality of functions required in such an application, including touchscreen, speaker, digital video/audio, magnetic stripe/ chip card reader, receipt printer, statement printer , laser printer, ticket printer, bankbook printer, PIN pad generic device, all generally referenced by the numbers 13 in FIG. 1 with the exception of the touchscreen shown by reference 18. The function and operation of devices 13 are well known and other than the touchscreen device 18, form no significant part of the preferred embodiment of the present invention.

The following documentation and manuals provide further description of the CDS/2 system and are available from International Business Machines Corporation:
* IBM Consumer Device Services for OS/2 Programming Reference, FC09-2173
* IBM Consumer Device Services for OS/2 Guide to Operations, SC09-2174
* IBM Consumer Device Services for OS/2 Licensed Program Specifications, GC09-2197
* IBM Consumer Device Services for OS/2 Application Support Functions The description and content of these manuals and documentation is included herein by reference. This previous somewhat high level description of the Consumer Device Service program is believed to be sufficient as the various components and function referred to are well understood by those skilled in the art.

As has been indicated, the CDS/2 environment will be referred to in this application to illustrate the preferred embodiment of the subject invention for the handling of input data composed of multi-byte character sets created from a touchscreen keyboard. It is appropriate, however, to first provide some background for various terms that will be referred to in the description so as to provide a better appreciation of the significance of the subject invention.

A single byte character set is a character encoding in which each character is represented by one byte. Single byte character sets are limited to 256 characters. An example of such a character set is English language characters. Multi-byte character sets are mixed width character sets in which some characters consist of more than one byte. A double byte character set is a specific type of multi-byte character set and includes characters that consist of one byte and some characters that consist of two bytes, or alternatively all characters which consist of two bytes.

Chinese, Japanese and Korean languages consist of ideographic characters which are represented in computer systems using two bytes in double byte character sets and also have no case distinction. In Chinese and Japanese, ideographic characters are traditionally read from top to bottom in columns that run from right to left. In Korean, ideographic characters are traditionally read from top to bottom in columns that run from left to right. Many documents are read horizontally from left to right.

Ideographic characters can consists of up to 36 strokes that are grouped into one or more elements. Characters with only one element are generally called radicals which can be thought of as a group of strokes in a character that are treated as a unit. In most characters that consist of two or more elements, one element is a radical and the other elements determine the character's phonetic value. To obtain a further understanding of the makeup and handling of ideographic characters of various national languages in computer systems, reference can be made to the previously identified book by Nadine Kano.

It becomes apparent that problems arise when one considers entering into a computer system, multi-byte characters for languages such as Chinese, Japanese and Korean via touchscreen keyboards in that single touchscreen touches cannot represent a full character. Multiple symbols are needed to form a single character. The traditional input method editor (IME) provided in typical operating systems for handling inputs from physical keyboards as previously referred to is not capable of handling multi-byte character set input from a touchscreen.

The subject invention broadly provides for a generic method for implementing multiple multi-byte character languages on a touchscreen keyboard. The invention, when incorporated into the CDS/2 environment or any other kiosk supporting environment, provides an interface to allow developers to build multi-lingual application systems that have the functional ability to call up keyboards on a touchscreen to support the entry and processing of different single byte and multi-byte character languages. As has been indicated, a principle objective for the subject invention is to accommodate the handling of multi-byte character languages on touchscreen keyboards.

It has already been observed that prior to the subject invention the CDS/2 system provides for touchscreen keyboard support for single byte languages. Referring again to FIG. 1 of the drawings, an application program interface (API) 14 as part of CDS/2 takes a keyboard definition file 24 representing a touchscreen keyboard, and along with functional services provided by operating system 12 displays the keyboard on the touchscreen 18 to the user. The keyboard definition file 24 is a program module that contains information as to the appearance of the keyboard on the touchscreen, how keys when touched by the user are processed, and how inputted text is displayed on the screen including font colour, size and position of the text as generally shown in FIG. 2.

Figure 2:
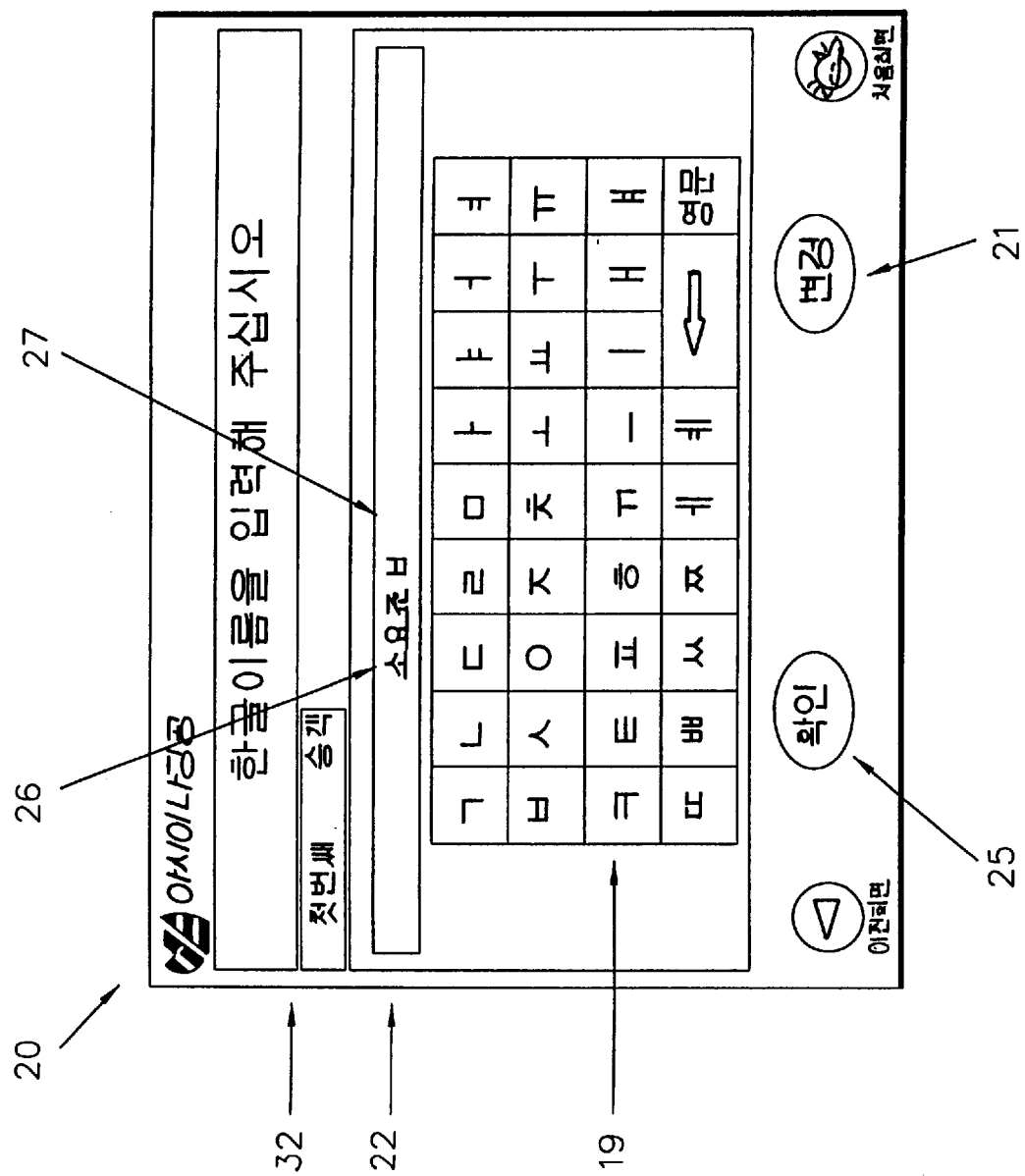
FIG. 2 is an illustration of an example of a touchscreen keyboard for use with the subject invention.

A typical touchscreen keyboard 19 for multi-byte character languages is illustrated on screen 20 in FIG. 2 for the Korean language. The user inputs the required text using the touchscreen keyboard 19 by touching or pressing on the appropriate keys displayed on the screen as is well known. When the user is satisfied that all of the text has been inputted, an OK button 21 on screen 20 is pressed and the application stores the entered text for display on display area 22 of screen 20.

As has been generally described, FIG. 2 illustrates a touchscreen keyboard resulting from the use of API modules 14 within the CDS/2 shown in FIG. 1, along with the subject invention. Screen 20 displays to the user Korean touchscreen keyboard or keypad buttons 19, a display area 22 showing the text being inputted by the user as it is entered, a CANCEL button 25 and an OK button 21. Touchscreen keyboard buttons 19 represent all the Korean symbols that make up characters of the Korean language. One, two or three of these symbols can make up a fully formed Korean character. Over 11,000 Korean characters make up the Korean language. As the user of the touchscreen keyboard touches the symbols on the screen, display area 22 shows the text string that is being typed including all fully formed characters 26 and the current interim (unfinished) character 27. Prompt area 32 on display 20 is where instructions are provided to the user to enter data such as the name or other personal information of the user. When the user is finished typing in the required text, the OK button 21 is pressed entering the final text into the system. The CANCEL button 25 is used to abort the current text input.

In order to handle the multi-byte character language input as has been previously mentioned with reference to FIG. 1, keyboard definition file 24 that is used by an API 14 and operating system 12 to display the text inputted from the touchscreen as described above, is enhanced from the conventional keyboard definition file that is used for single byte characters. This enhancement allows for the addition to the keyboard definition file of a particular keyboard under consideration to provide for the handling of multi-byte characters in addition to single byte characters, the human language the keyboard is implementing, as well as unique text display attributes for interim character and bidirectional languages. This activity can be thought of as the keyboard processing function or keypad process as will be subsequently more fully described.

An example of such an enhanced keyboard definition file format to implement the invention is now provided. The keyboard definition file is used to describe the setup and functionality of the touchscreen keyboard for the application. As will be subsequently described, the keyboard definition file is used in conjunction with the Keypad_Process function included as part of the operating system to implement the invention.

The preferred form of the keyboard definition file has three lines. Each line contains descriptive information delimited by commas, describing the setup and functionality of the touchscreen keyboard or as also referred to herein as the keypad. A typical setup of the lines of code in a keyboard definition file for implementing the invention is as follows:

LINE 1: BitmapName,Xloc,Yloc,FontName,FontSize, MinLength,MaxLength, DBCSENABLED, InterimFontName,InterimFontSize,InterimBackCol, InterimForeCol LINE 2: InputBackCol,InputForeCol,SelectKeyCol, FuncKeyCol,QuitKeyCol,FlashKeyCol LINE 3: "FormatString",SecureFlag,BMPError,TXTError The elements of the above coding lines have the following meaning:

Line 1

BitmapName=File containing the bitmap of keypad to be displayed on the screen with corresponding touch button file.

Xloc=X coordinate pointing to where input text is to be displayed on the screen.

Yloc=Y coordinate pointing to where input text is to be displayed on the screen.

FontName=Font used to display input on the screen.

FontSize=Font size used to display input on the screen.

MinLength=Minimum length of input (Any less causes a FORMAT error)

MaxLength=Maximum length of input (Any more is rejected)

DBCSENABLED=Flag indicating that this keyboard supports multi-byte characters

InterimFontName=Font used to display Interim Characters

InterimFontSize=Font size used to display the Interim Characters

InterimBackCol=Background colour of Interim characters

InterimForeCol=Foreground colour of Interim characters

Line 2

InputBackCol=Background colour of displayed input

InputForeCol=Foreground colour of displayed input

SelectKeyCol=ULONG value of colour used for selection keys

FuncKeyCol=ULONG value of colour used for function keys

QuitKeyCol=ULONG value of colour used for QUIT key

FlashKeyCol=ULONG value of colour used for flashing

FormatString=String within quotation marks specifying expected format.

SecureFlag=Specify whether characters are displayed or hidden by '*'

BMPError=Bitmap to be displayed in case of a FORMAT error

TXTError=Text to be displayed in case of a FORMAT error

The functions of the various above defined elements of the keyboard definition file are considered to be readily apparent to those skilled in the art from the description provided for each.

The last five elements indicated above in Line 1 starting at "DBCSENABLED" including the four following elements starting with "INTERIM" provide for the processing of inputs for multi-byte character languages by the appropriate API and the operating system, as previously described.

The following is an example of a Keyboard Definition File in C Programming Language:

a7.bmp,250,375,MINCHO,18,2,8,DBCSENABLED, MINCHO,18,16777215,65536005 2621480, 16777215,BMP,kor_name.fsh "DDDDDDDD",0, name_err.par,0

Dynamic link library files (DLLs) 15 and API calls or functions 14 are provided as part of the CDS/2 device 10 as indicated in FIG. 1. These DLL files 15 are selectively called as needed by CDS/2 10, in order to have various functions, including kiosk related functions, performed. The particular DLL file 15 that supports touchscreen 18 takes inputs entered by a user from touchscreen 18 and in combination with the input method editor (IME) 23 provides handling functions for the multi-byte character languages provided for in the system. In effect, this DLL module 15 takes the scan code equivalent to the keys that would have been pressed on a physical keyboard which are the touchscreen points resulting from the entering of the multi-byte characters on the touchscreen 18 and performs input method editing functions in order to derive an output of fully formed national language characters as well as any interim characters to be displayed on the screen. An interim character is a potentially partially formed character. It is dependent on the next keystrokes from the user to determine what the fully formed character might end up being. In effect, the DLL module 15 takes the touchscreen points resulting from user input and converts them to physical keyboard inputs for processing by input method editor 23 as for an actual keyboard and displays the characters on screen 18. Effectively, what appears to the input method editor 23 is physical keyboard inputs whereas the function of the selected DLL IS is to convert the touchscreen points representing the multi-byte characters to physical keyboard inputs. This is subsequently referred to as the keypad process. The input method editor functions as a means for converting inputs from the touchscreen keyboard into characters to be displayed on the display screen.

The handling function performed by input method editor 23 is based on the national language selected by the program developer in the application program 11, whether it be single byte character or multi-byte character language as specified in the keyboard definition 24 file and the codepages resident in operating system 12 for those various languages. These codepages provide the standard coding representations of character sets for national languages as adopted by ISO to enable operating system 12 to display characters on a screen in the designated national language format as is well known in the art. The codepage could be, for example, a double byte character set codepage for the OS/2 operating system or a Unicode codepage on Windows NT operating system. Unicode is a generic standard of character set coding adopted by the International Standard Organization. The result is that the particular DLL module takes the input from the touchscreen keyboard 19 and displays the appropriate input string and interim characters in display area 22 on screen 20 as the user enters information from the keyboard on the touchscreen.

A Keyboard Input API as generally shown by element 14 in FIG. 1, requests a variety of functions to be performed by operating system 12 for the kiosk application.

The Keypad Process as previously introduced loads, displays, and provides the processing for inputs from a data entry touchscreen. The process includes a blocking function that returns the display screen to the original keyboard display when the user selects one of the CANCEL or OK function buttons located across the bottom of the screen as previously described. FIG. 2 shows an example of what the keypad data entry screen looks like for a Korean keyboard. This example was created using an appropriate keyboard definition file and the keyboard process API. Of course, the keyboard shown in FIG. 2 for entering Korean language inputs is just an example of a multi-byte human language to illustrate the invention. The invention could readily be used for other multi-byte character languages including Chinese and Japanese languages.

The Keypad process, resulting from the particular API 14 supporting the touchscreen, functions provided by CDS/2 and keyboard definition file 24, is represented by the following pseudocode:

USHORT Keypad_Process (PCHAR BMPKeypadPath, PCHAR BMPKeypadFilename, PCHAR TXTKeypadPath, PCHAR TXTKeypadFilename, PCHAR PBMKeypadName, PCHAR InputedText, ULONG TimeoutLength, BOOL TimeoutDisable)

These elements or parameters have the following meanings as input variables to the keypad process function:

BMPKeypadPath—input (PARAMETER1)

Address of the ASCII path to the keypad definition file to be loaded.

BMPKeypadFilename—input (PARAMETER2)

Address of the ASCII file name of the keyboard definition file to be loaded.

The above two elements provide for the processing of the keyboard definition file 24 previously described.

TXTKeypadPath—input (PARAMETER3)

Address of the ASCII path to the text file to be loaded with this screen.

TXTKeypadFilename—input (PARAMETER4)

Address of the ASCII file name of the text file to be loaded with this screen.

PBMKeypadName—input (PARAMETER5)

Address of the ASCII file name of the partial screen bitmap file of the keyboard to be loaded for this screen. The partial screen bitmap file name can be either a partial screen bitmap file or the name of a file containing a list of partial screen bitmap files. The latter is referred to as a PAR file.

InputedText—input/output (PARAMETER6)

Address of a buffer area to store the data being inputted on the keypad screen.

On input, the data in this field will be displayed in the keypad data area. On return, the data entered in this field is the text entered by the user.

Data in this string should always be null terminated.

It is the caller's responsibility to ensure the data buffer is large enough to store any and all data inputted within the keypad screen.

TimeoutLength (ULONG)—input (PARAMETER7)

The time the screen will wait without input before returning TIMEOUT.

TimeoutDisable (BOOL)—input (PARAMETER8)

Timeout disable flag.

This keyboard or keypad processing function reads the contents of the enhanced keyboard definition file 24 and determines how to display and process the touchscreen keyboard input. This results from the API passing to the keypad processing function the parameters 1 and 2 which relate to the keyboard definition file. To display the keyboard input to the user the keypad process function displays the keyboard bitmap named from keyboard definition file 24 as previously described. Overlayed on the bitmap, text may be passed to the keyboard processing function as indicated by parameters 3 and 4. The text in these parameters is used to prompt the user and provide instructions as to what information needs to be entered on the touchscreen. This text is not incorporated in the keyboard definition file to allow the keyboard definition file to be used for different types of input in one application. Parameter 5 provides the keypad processing function to include an overlay on the keyboard of any additional desired design or logo, for example.

Parameter 6 is used to pass back to application 11 text that was inputted by the user via the touchscreen. Parameters 7 and 8 are used as a screen timeout to limit the amount of time the keyboard is displayed to the user.

Once the screen is displayed to the user, any touches of the touchscreen by the user are processed by the keyboard process function. If the user touches the buttons of the touchscreen keyboard this function will interact with the system IME and determine what fully formed characters and interim characters result from the sequence of touchscreen keyboard buttons pressed as previously described. The resulting string (fully formed and interim characters) are displayed to the user in the display area on the screen. This processing is continued until one of the following events occur:

1. The user touches the OK button to signal the end of input.
2. The user touches the CANCEL button to abort the touchscreen keyboard input.
3. The timeout period has expired.

The keyboard process functions return code indicates which of the above three events occurred. If the OK button was pressed, the "input text" parameter will point to the inputted string of text.

The above described processing allows self-service applications to use touchscreen keyboards to provide input in a variety of character sets including single byte, multi-byte and mixed byte languages for a variety of national languages. The touchscreen keyboard handling techniques described herein provide for a platform independent solution to the handling of multiple multi-byte characters and can be implemented on any operating system that support multi-byte languages.

The implementation of the above described files and coding are considered to be well within the capabilities of those skilled in the art.

Figure 3:
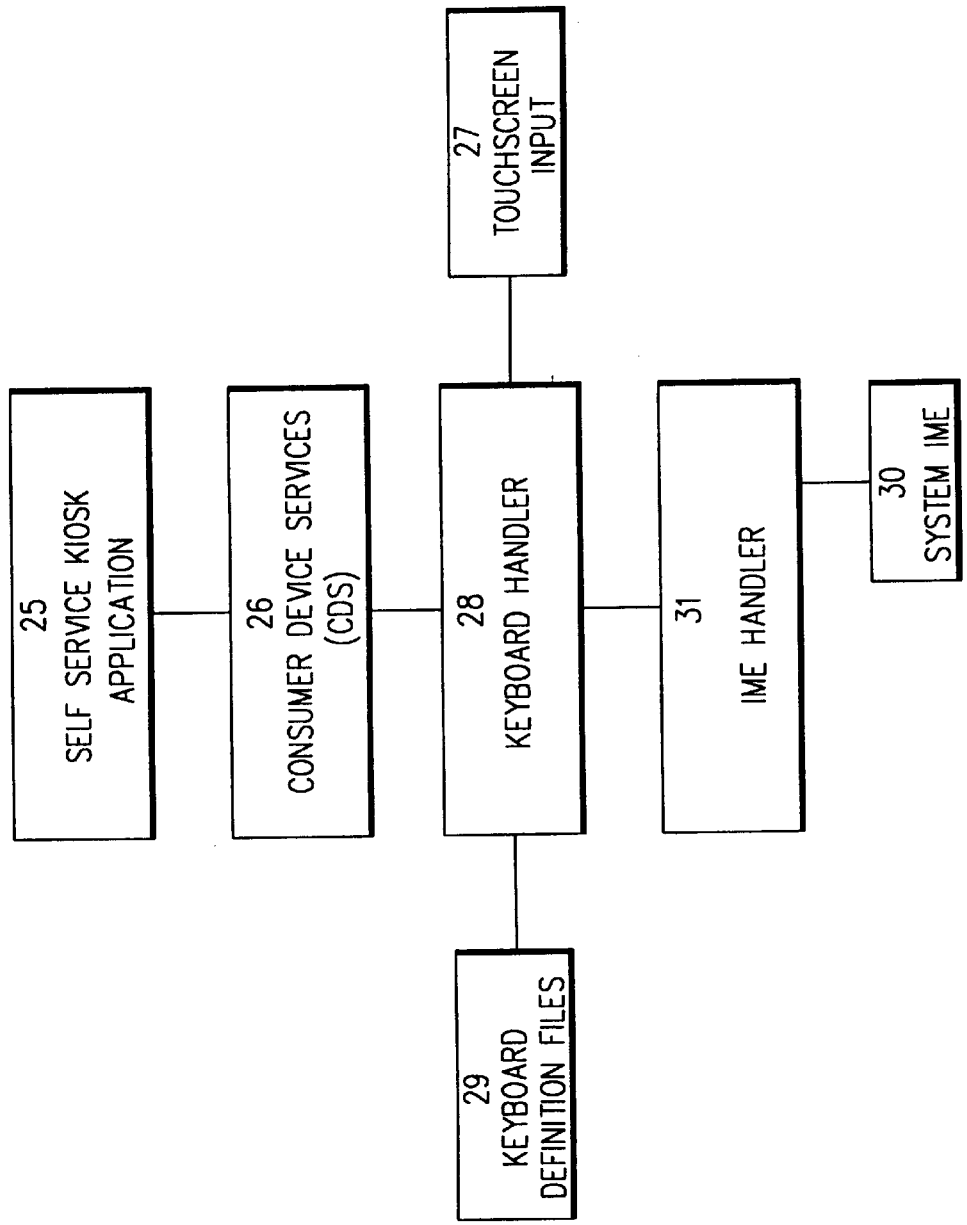
FIG. 3 is a high level functional diagram of the touchscreen keyboard software architecture for illustrating the invention.

FIG. 3 is a functional diagram of the touchscreen keyboard software architecture based on the described invention. This provides in diagram form much of the previously provided function and pseudocode description supporting the invention. Some of the elements shown in FIG. 3 may be functionally the same as those previously shown and described with reference to FIG. 1. Self Service Kiosk Application 25 calls a single API, which is part of Consumer Device Services (CDS) 26, to display and get touchscreen keyboard input 27 from the user of the touchscreen system. Keyboard handler 28 functions within CDS 26 and makes use of keyboard definition file 29 to provide the logic required to translate touchscreen input 27 (X,Y coordinates) touch inputs into scan codes that can be fed to the IME 30.

IME handler 31 interacts with the system IME 30 (provided by the operating system for physical keyboards as previously described) and interprets the responses from the system IME 30 and feeds them back to the keyboard handler 28. The keyboard handler 28 takes the returned fully formed characters and interim characters and displays the appropriate information and text on the display screen to the user. This process is continued until the user signals the text input is complete, decides to cancel the text input process, or the screen timeout expires, as previously described.

In the drawings and specification, there has been disclosed a preferred embodiment of the invention and although a particular environment and specific terms are referenced, they are used only in a generic and illustrative sense and not for purposes of limitation. The scope of the invention is as set forth in the appended claims.

The embodiments of the invention in which an exclusive property or privilege is claimed are defined as follows:

1. In a programmed computer system enabling a user to enter multi-byte characters of national languages into the computer system from a touchscreen keyboard and to display the characters on a display screen, where said computer system includes an operating system having means for converting inputs from a physical keyboard into displayed characters and a keyboard definition file for processing by the computer system to provide the touchscreen keyboard on the display, the improvement in the computer system comprising:

said keyboard definition file includes means for specifying a national language for the touchscreen keyboard and means for supporting multi-byte character language inputs from the touchscreen keyboard entered by the user; and a keyboard input module functioning in conjunction with said keyboard definition file and a touchscreen support module functioning in conjunction with said converting means;

whereby said keyboard input module and said touchscreen support module executed by the computer system, process inputs entered by the user from the touchscreen keyboard to display multi-byte characters of the national language on the display screen.

2. The programmed computer system as provided for in claim 1, wherein said keyboard definition file includes attributes for displaying interim characters, fully formed characters and bidirectional characters for the specified multi-byte character national language.

3. The programmed computer system as provided for in claim 1 where said touchscreen support module is a program in a dynamic link library called by the computer system.

4. The programmed computer system as provided for in claim 1, where said keyboard input module is an application program interface called by the computer system.

5. The programmed computer system as provided for in any claim 1 wherein said means for supporting inputs of multi-byte character languages from the touchscreen keyboard by the user includes lines of code in the keyboard definition file.

6. The programmed computer system as provided for in claim 1, where said means for converting inputs from a physical keyboard into displayed characters is an input method editor program.

7. The programmed computer system as provided for in claim 6 wherein said touchscreen support module and the input method editor program provide for outputs to be displayed on the display screen consisting of interim and fully formed national language characters.

8. The programmed computer system as provided for in claim 6 wherein the functions performed by the input method editor on the inputs entered by the user are based on the national language identified in the keyboard definition file and codepages for the specified national language provided by the operating system.

9. The programmed computer system as provided in claim 1, including means activated by the user to indicate to the system that no further user inputs are to be provided from the touchscreen.

10. The programmed computer system as provided for in claim 9, said means activated by the user includes a functional button on the touchscreen keyboard consisting of an OK button or a CANCEL button.

11. The programmed computer system as provided for in claim 1, wherein the multi-byte national language is selected from the language group of Korean, Chinese and Japanese.

12. The programmed computer system of claim 1 where the computer system provides support for a self-service kiosk.

13. A method for use in a programmed computer system for processing and displaying user inputs including characters of multi-byte national languages on a display of a touchscreen keyboard, said method comprising the steps of:

specifying a national language of the characters to be entered and displayed;

displaying a touchscreen keyboard enabled for a user to enter characters of said multi-byte national language;

providing multi-byte national language character inputs from the touchscreen;

translating said multi-byte character touchscreen inputs into scan codes to create responses by an input method editor; and interpreting said responses to display the multi-byte characters in said national language on said display of the touchscreen.

14. The method of claim 13 wherein said displayed characters include interim and fully formed multi-byte characters of said national language.

15. The method of claim 13 wherein said multi-byte national language is selected from the language group of Korean, Chinese and Japanese.

16. The method of claim 13 wherein said programmed computer system is part of a self-service kiosk.

* * * * *